INVENTOR.
Philip E. Ohmart
BY Wood, Herron & Evans.
ATTORNEYS.

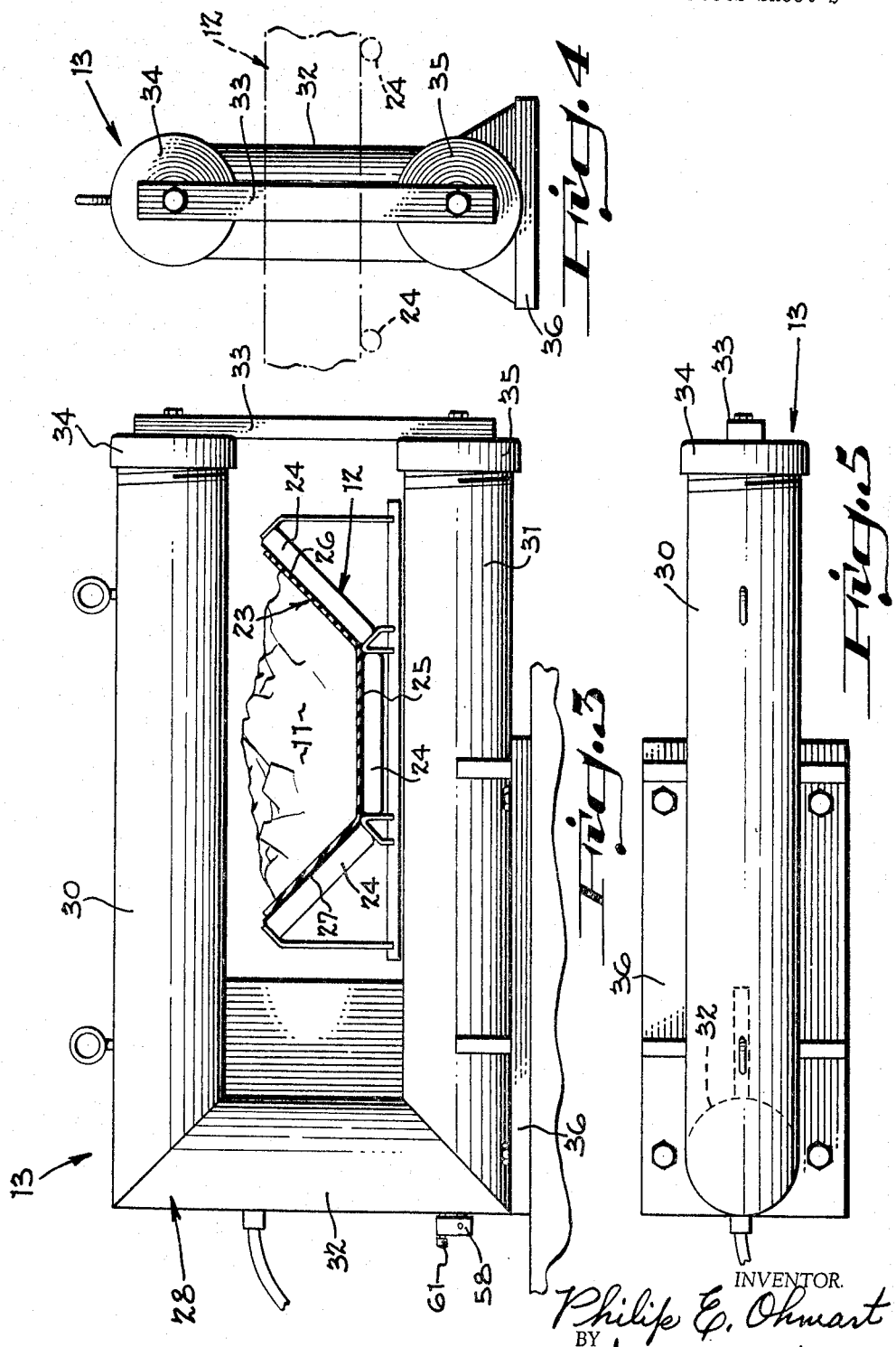

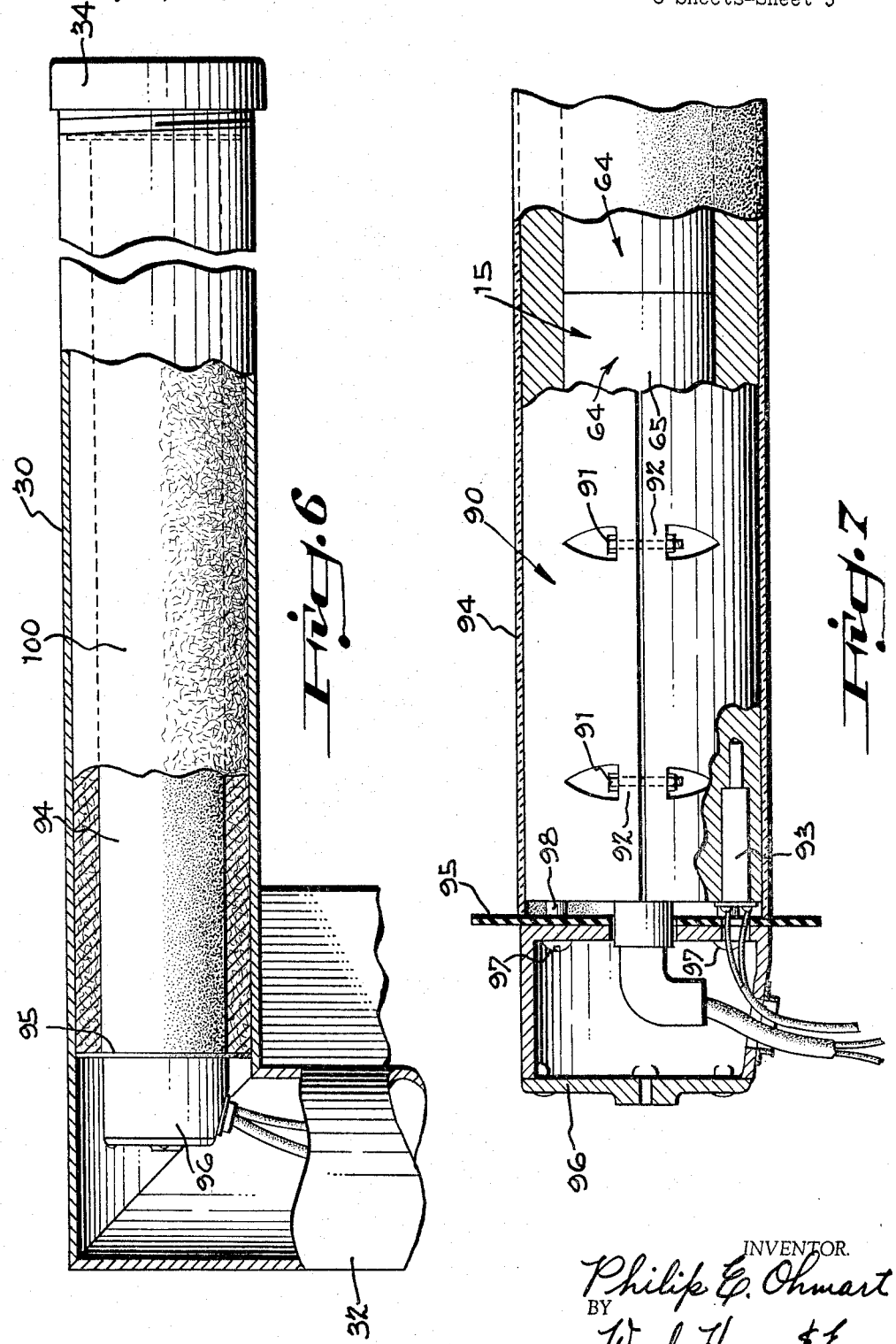

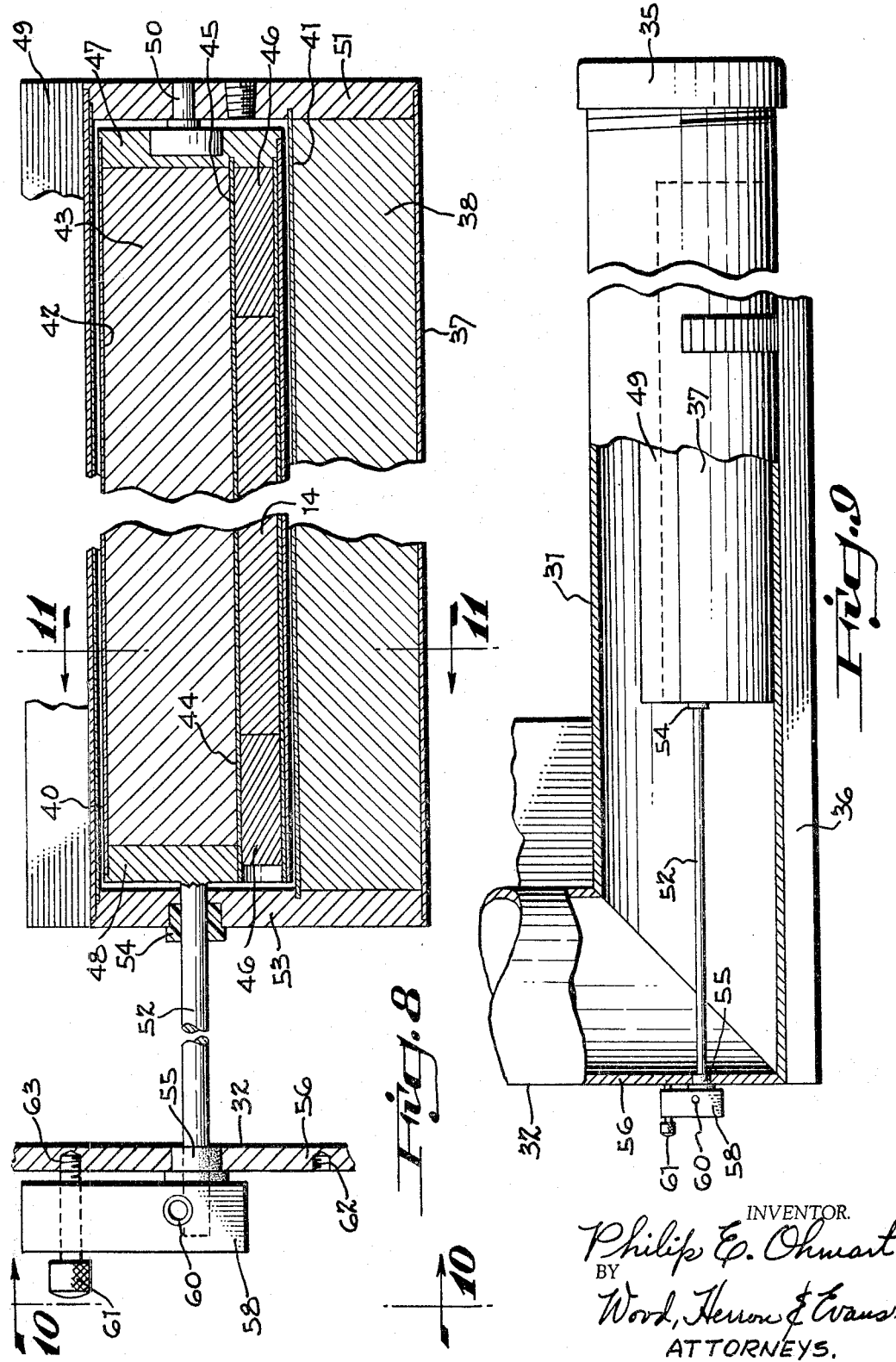

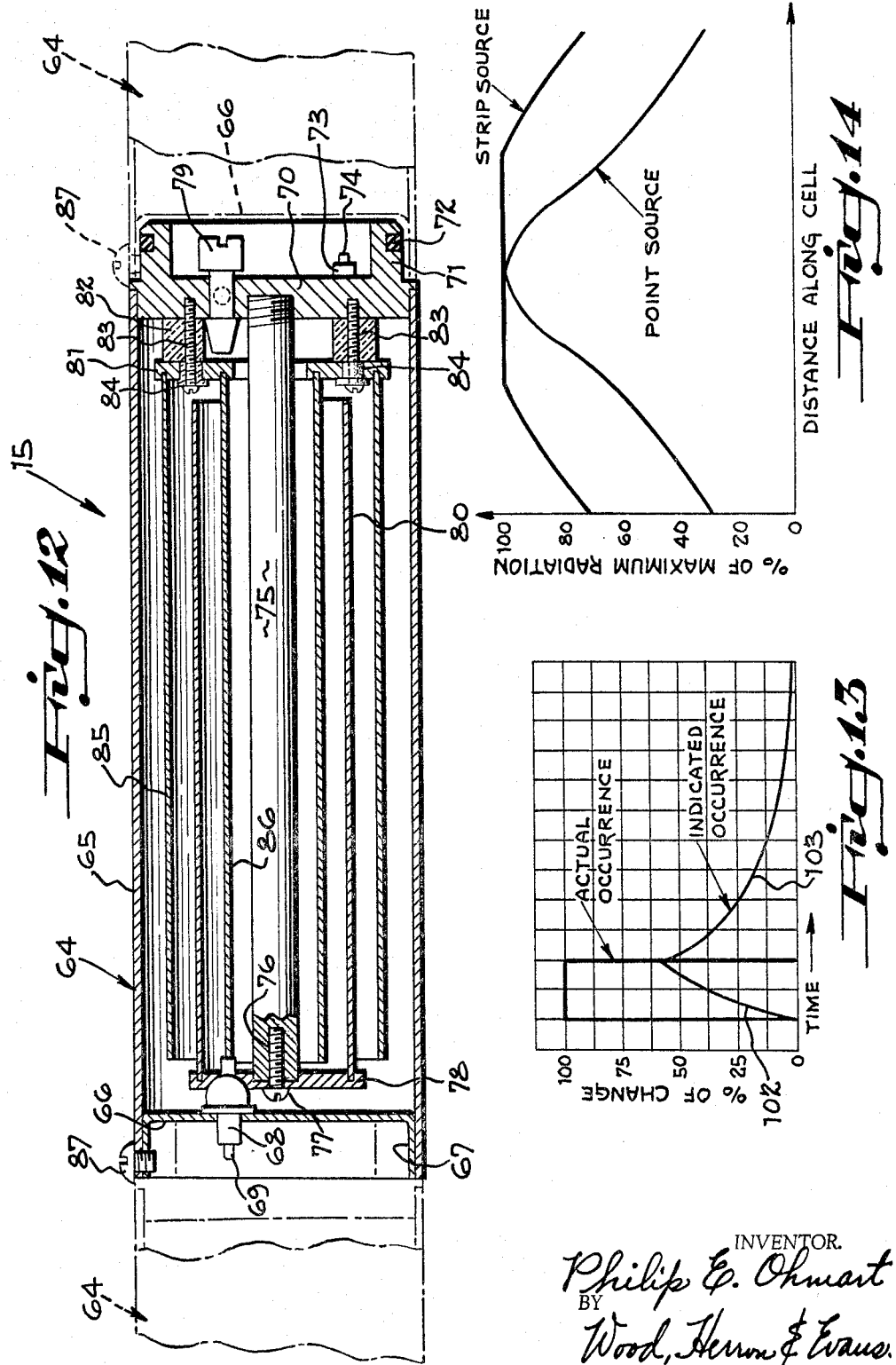

3,278,747
METHOD AND APPARATUS FOR CONTINUOUSLY WEIGHING MATERIAL ON A CONVEYOR COMPRISING A RADIOACTIVE SOURCE AND DETECTOR
Philip E. Ohmart, Cincinnati, Ohio, assignor to The Ohmart Corporation, Cincinnati, Ohio, a corporation of Ohio
Filed July 29, 1963, Ser. No. 298,179
4 Claims. (Cl. 250—83.3)

This present invention relates to measuring systems and is particularly directed to a novel system for measuring the weight of solid materials as they are delivered on a conveyor.

The principal object of the present invention is to provide a method and apparatus utilizing a radioactive source and detector for continuously, and with great accuracy, weighing materials as they are delivered on a belt or other type of conveyor.

In the past it has been conventional to weigh material on a belt or similar conveyor by various mechanical belt scales using poises with beam balances, strain gages, differential transformers, pneumatic or hydraulic load cells or the like. These mechanical weighing systems are not completely satisfactory in several respects. In the first place, their accuracy is affected by many extraneous and uncontrollable factors, such as ballistic error, changes in belt tension, belt speed and the like. Moreover, these mechanical weighing units require moving parts in contact with the belt so that in some installations their operation is rapidly impaired, particularly when abrasive materials are being handled. These gages frequently require excessive maintenance and of necessity must be positioned in a readily accessible location. Also, the gages must be frequently calibrated requiring the use of special weights and chains. Moreover, the installation of these gages frequently requires the use of special conveyor sections, foundations or the like, which are not only expensive but which waste an appreciable amount of space. A still further disadvantage of mechanical gages is that they cannot be used with many types of conveyors, for example drag chain conveyors, vibrating conveyors or apron conveyors.

It has also been proposed in the past to weigh certain types of materials, such as bagasse, by means of a radioactive source and a radiant energy detector disposed on opposite sides of the material conveyor. While this type of apparatus has proved generally satisfactory in a few installations, its utility is inherently limited to handling material of fairly uniform, low density on conveyors on which the contour of the material is carefully controlled by scrapers or the like. Inherently, this type of apparatus introduces large, and totally unacceptable, errors when the profile of material on the belt is shifted to any appreciable extent. For example, errors of the order of 20% and larger are encountered when measurements are made of exactly the same amount of material configurated on the belt in two different profiles. Also, in order to measure dense material, such as ore and the like, by the use of such apparatus would require the use of a prohibitively large source of radiation. As a result, this type of apparatus is practical for use in only an exceedingly limited number of installations for handling very limited types of material.

The weighing system of the present invention eliminates each of these difficulties. More particularly, the present weighing system is of the non-contact type, i.e. it does not include any parts which contact either the conveyor or the material being conveyed, and hence avoids the difficulties inherent in mechanical weighing systems. Moreover, the present system can be utilized to weigh all types of materials with high accuracy despite any changes in material profile. Thus, the present system is free of the limitations imposed on previous radioactive type weighing apparatus.

Specifically, the present system comprises a distributed source of radioactive material and an elongated detector. The detector and source extend horizontally in a direction transverse of the conveyor and are spaced from one another in a vertical plane with the conveyor interposed between them. Thus, radiations emitted from the distributed source pass through the conveyor and material carried on the conveyor and impinge upon the elongated detector. The detector, which may be of any suitable type, such as an ionization chamber, Geiger counter or radiant energy electric generator (or Ohmart cell), is effective to produce an electrical current flow which is correlated with the amount of radiation impinging upon the detector. Since this amount of radiation in turn depends upon the amount of radiation absorbed by the material upon the conveyor, the detector current is correlated with the weight of material on the conveyor in the area scanned by the source and detector. In most cases this current is subsequently multiplied by a tachometer signal, or the like, correlated with the belt speed and the resultant signal is integrated to indicate the total weight of material delivered by the conveyor. If the belt speed remains substantially constant, a tachometer signal can be eliminated and the detector signal can be amplified and integrated to provide a direct indication of weight delivered.

One of the principal advantages of the present weighing system is that it can be employed to measure all types of material with extreme accuracy. For example, some installations have proven accurate within one-fourth of one percent and an accuracy within one-half of one percent is readily obtainable over any substantial operating period, e.g. an hour or more.

I have empirically determined that the present high accuracy is due in a substantial part to the elimination or minimizing of errors due to changes in profile of material on the conveyor. In practice, bulk material on a conveyor is not symmetrically positioned with the high point of the material on the center of the conveyor. Rather, this high point will tend to shift in a random fashion from one side of the conveyor to the other. At first blush, it would appear that the effects of this changing profile could best be eliminated by passing a beam of radiation in a horizontal plane through the material. At the same time, it would appear that orienting the beam in this manner would provide the most accurate measurement of the amount of material on the conveyor since the level of material would be measured against an air background of considerably less density than the material itself.

The present invention is predicated in part upon the empirical discovery and determination that errors due to changing volumetric or density profile are minimized and optimum weighing accuracy is obtained not by passing a beam of radiation in a horizontal plane, but rather by passing the beam vertically between a distributed source of ratiation and an elongated detector, each of which is of an effective length equal to, or greater than, the maximum width of material on the conveyor. When a source and detector of this configuration are utilized, the signal output of the detector is accurately correlated with the weight of material on the conveyor despite any changes in the height of material or the shape of the profile. Moreover, since the present weighing device does not contact the conveyor, the units accuracy is completely independent of conveyor angle, tension, vibration or direction so that the present gage can be used on reversible conveyors if desired.

Another important advantage of the present weighing method, in addition to its great accuracy, is that it can be used on all types of conveyors including vibrating conveyors, drag chain and apron type conveyors in conjunction with which it has not heretofore been practical to provide automatic weighing.

As is explained in detail below, in a preferred form of weighing apparatus constructed in accordance with the present invention, the detector is comprised of a stack of elongated radiant energy electric generators, or Ohmart cells. These Ohmart cells function to transform the impinging radiant energy into a small electric current which is amplified and fed to the weight recorder. This preferred form of apparatus is particularly advantageous in that the accuracy of measurement is improved by minimizing the effects of statistical variations in the radiations from the radioactive source. I have furthermore empirically determined that the response characteristics of the radiant energy electric generator which eliminate errors due to noise do not adversely affect the accuracy of weight measurement even when rapid weight changes are encountered, such as might be occasioned by the presence of a large rock or void on the conveyor.

A still further advantage form of the present apparatus is that it requires no special conveyor section, or the like, and is easily installed in a minimum of space; for example, only eight inches of conveyor length and minimum height, e.g. of the order of two feet from the conveyor bed without requiring relocation of idler rollers or other reworking of the conveyor.

More particularly, a preferred form of apparatus comprises a C-frame having upper and lower horizontal arms disposed above and below the conveyor. One arm houses the elongated detector, while the other arm houses the elongated source. This unit is quickly and easily mounted at any desired point along the conveyor with the arms extending across the conveyor; and since the unit requires little maintenance, it can be placed in a relatively inaccessible position if desired. The arms are spaced a minimum distance apart to provide clearance for the conveyor and material. Consequently, not only is the space requirement of the apparatus minimized, but also the amount of radioactive material needed is reduced.

A still further object of the present invention is to provide a ready means for calibrating the weight recording device. Specifically, in accordance with the present invention, the elongated radioactive source is movably mounted in a holder of radiation absorbent material, such as lead, and means are provided for selectively positioning the source in three positions; a closed position in which the source is substantially shielded, an open position in which a maximum amount of radiation from the source is emitted upwardly in a collimated beam through the conveyor and impinges on the detector, and a calibration position in which the source is partially shielded so that only the amount of radiation corresponding to a known material weight on the conveyor impinges upon the detector. The present source includes means for adjustably securing the source in this calibration position so that the source can readily be returned to it whenever it is desired to calibrate the unit.

These and other objects and advantages of the present invention will be more readily apparent from a consideration of the following detailed description of the drawings illustrating a preferred embodiment of the invention.

In the drawings:

FIGURE 3 is a transverse cross sectional view through a conveyor showing the present weighing apparatus.

FIGURE 4 is an end view of the apparatus shown in FIGURE 3.

FIGURE 5 is a top plan view of the apparatus shown in FIGURE 3.

FIGURE 6 is a view of the detector supporting arm of the C-frame partially broken away to show details of construction.

FIGURE 7 is an enlarged view of a detector stack partially broken away to show details of construction.

FIGURE 8 is a vertical section through the source carrying arm of the C-frame.

FIGURE 9 is a front elevational view of the source carrying arm of the C-frame partially broken away to show details of construction.

FIGURE 12 is a longitudinal cross sectional view through one component detector.

FIGURE 13 is a graph comparing the actual response of the present device with the theoretical response to a large change in material weight.

FIGURE 14 is a graph showing a comparison of the radiation pattern from a point source and a strip source.

Figure 1:
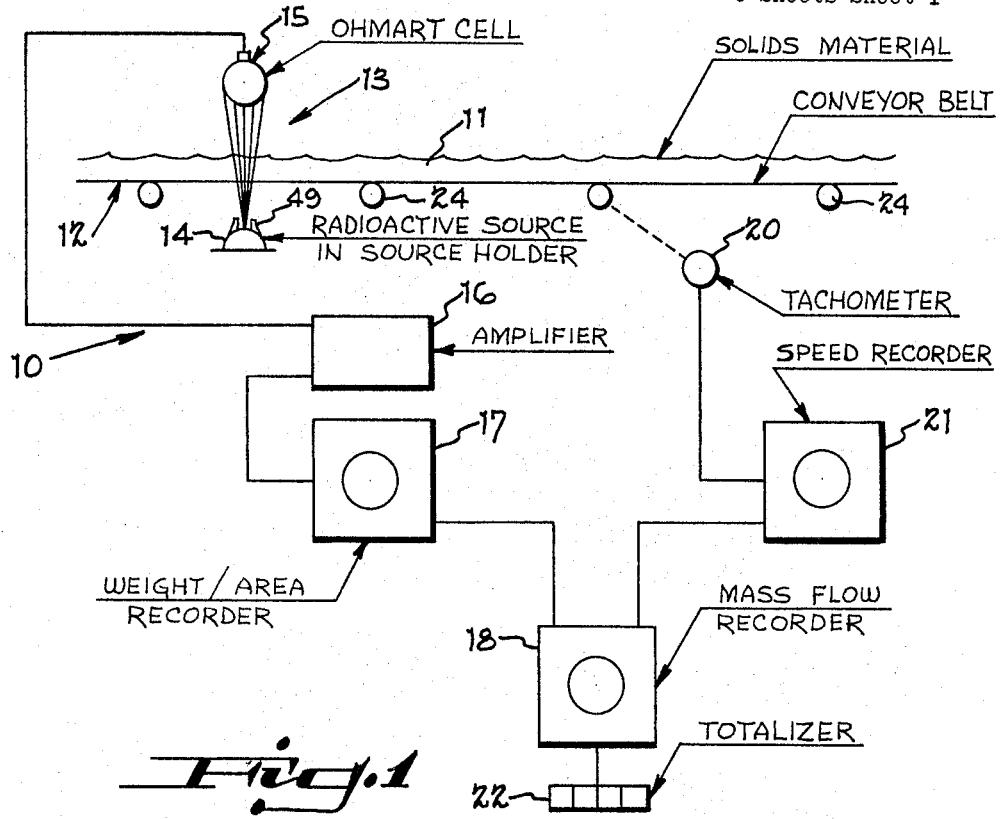
FIGURE 1 is a diagrammatic view and circuit diagram of one form of conveyor weighing system of the present invention.
Figure 2:
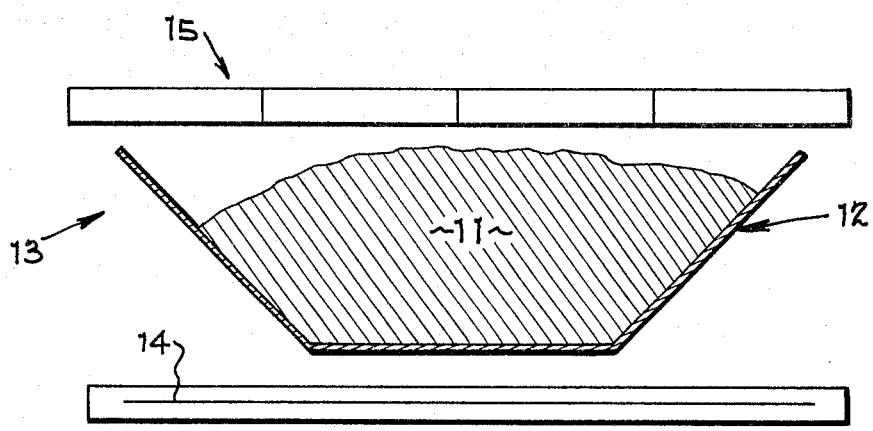
FIGURE 2 is a diagrammatic transverse view of a conveyor and weighing apparatus of the present invention.
Figure 10:
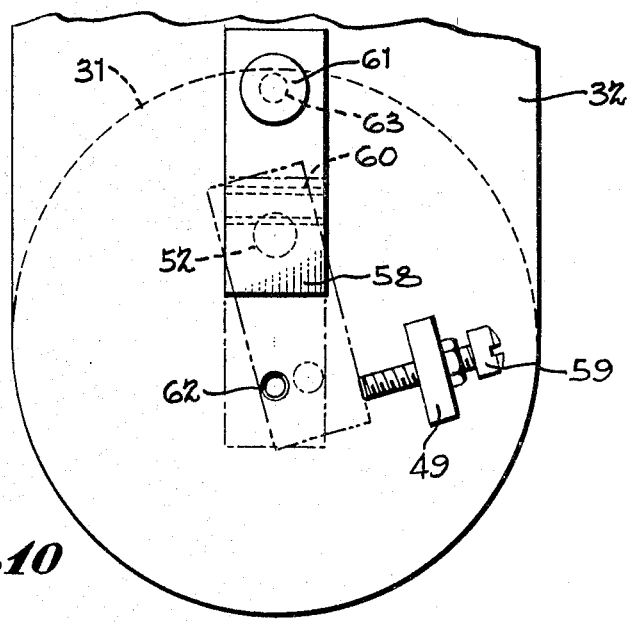
FIGURE 10 is an end view of the source carrying arm of the C-frame as viewed from line 10—10 of FIGURE 8.

One preferred form of weighing system 10 constructed in accordance with the principles of the present invention is diagrammatically shown in FIGURES 1 and 2. As there shown, the system is employed to measure the mass flow rate of material 11 carried by a belt conveyor 12. The present system can be used to weigh any material whether the material is conveyed in a dry form, slurry or even viscous liquid on the conveyor. Examples of materials which have been successfully handled are coal, limestone, clinker, fertilizer, gravel and ores of various types. Also, while a belt conveyor is shown in the drawings, the present system can also be employed to measure material on a vibratory conveyor (or vibratory feeder), an apron conveyor or a drag conveyor.

Essentially, the present system comprises a radiation type mass detecting unit 13. This unit comprises a horizontally disposed distributed radioactive source 14 and a parallel elongated detector 15. Source 14 is preferably in the form of a substantially continuous strip of radioactive material of a length slightly greater than the width of the belt. Alternatively, source 14 can comprise a plurality of spaced point sources positioned so as to give a distributed field pattern substantially constant across the width of the material on the conveyor generally similar to that of a continuous strip source. (By way of example, one form of point source construction comprises five equispaced point sources disposed on a transverse horizontal line with the outside sources being disposed slightly beyond the limits of material position on the belt.) Detector 15 preferably comprises a substantially continuous detector of an effective length in excess of the width of material on the belt. This detector may comprise a single detector or a plurality of separate detectors.

In the specific embodiment shown, source 14 is mounted beneath the belt while strip detector 15 is disposed above the belt. It will be appreciated that the relative position of the source and detector can be reversed without departing from the present invention. In any case, however, the source and detector are spaced from both the load and belt. The radioactive source 14 emits radiation in the form of gamma rays (alternatively a bremsstrahling source could be used) which pass through the material on the belt conveyor and impinge upon the detector 15. A portion of the radiation is absorbed by the material on the conveyor, so that the amount of radiation impinging upon the detector is attenuated by the mass of material on the conveyor interposed between the source and detector.

As is explained in detail below, detector 15 is effective to cause an electrical current flow which is correlated with the amount of radiation impinging upon the detector. One preferred form of detector is a radio-electric generator operating in accordance with the principles disclosed in the pending patent application of Philip E. Ohmart for "Method and Apparatus for Converting Ionic Energy Into Electrical Energy," Serial No. 591,173, filed June 13, 1956, now Patent No. 3,152,254. A detector of this type generates an electrical current correlated with the magnitude of the impinging radiation. Alternatively, detector 15 can be of any other suitable form, such as a Geiger tube or an ionization chamber, which in effect functions as a variable resistor permitting a current flow depending upon the amount of radiation impinging upon the chamber. While the detector is preferably a substantially continuous strip detector, it is contemplated that the detector can also comprise a plurality of spaced detectors extending across the width of material on the conveyor. This latter construction is intended to be embraced by the term "elongated" detector.

The output current of the detector is actually correlated with the weight of material per unit length of belt. This current output signal which may be quite small, for example of the order of $10^{-10}$ amperes, is amplified by a suitable amplifier 16. In the specific system shown in FIGURE 1, the output signal from this amplifier is applied to a weight per unit length recorder 17 and to a multiplier mechanism of the mass flow recorder 18. This multiplier mechanism of mass flow recorder 18 also receives an electrical signal correlated with belt speed. This electrical signal, which is generated by a tachometer 20 connected to an idler roller, feed roller or tail roller of the conveyor, is applied to a speed recorder 21 as well as mass flow recorder 18.

More particularly, in one typical form of multiplying arrangement, tachometer voltage is fed to a retransmitting slide wire of a regular potentiometric strip chart recorder mechanism. The detector signal, as amplified by amplifier 16, is fed to the recorder 18 to position the slide wire tap. As a result, the output signal from the slide wire tap to ground is the product of pounds per foot times foot per minute, or pounds per minute, which is the mass flow rate. The mass flow signal is then fed to another recorder pen for permanent recording. A suitable integrator mechanism totalizes this mass flow signal to obtain the total pounds or tons of material conveyed during a given period of time. This total weight is registered on totalizer 22.

It will be appreciated that where the belt speed is maintained substantially constant, i.e. with a variation of less than one-half of one percent for most installations, the tachometer 20 can be eliminated since the detector signal, which is really "pounds per lineal foot," also constitutes a mass flow signal "pounds per minute." Hence, this signal can be integrated to give total pounds, or tons, flowing in a selected time which figure is registered in totalizer 22.

The details of construction of one preferred form of mass indicator unit 13 are shown in FIGURES 3–12. As there shown, the material such as ore or the like to be weighed is carried on conveyor 12. This conveyor comprises a continuous belt 23 supported by a series of idler rollers 24 so that the belt includes a horizontal bottom wall portion 25 and two upwardly angulated diverging side portions 26 and 27. The conveyor thus forms a trough for supporting the material 11 which is loaded into the conveyor in a conventional random fashion.

Mass detecting unit 13 comprises a C-frame member 28 having a horizontal upper arm 30 and a horizontal lower arm 31 joined by a vertical arm 32. The arms are preferably held in parallel alignment by means of a brace 33 bolted or otherwise secured to cap members 34 and 35 threadably connected to the free ends of arms 30 and 31 respectively. The C-frame 28 is rigidly mounted upon a base member 36 in such a manner that arms 30 and 31 extend transversely of conveyor 12 with arm 31 being disposed beneath the conveyor and arm 30 above the conveyor.

Arm 30 houses elongated detector stack 15, while lower arm 31 houses elongated radiation source 14. The details of the radiation source mounting and detector construction are described below. It is important to note at this point, however, that the effective length of detector stack 15 is such that the detector overlies at least the entire limit of distribution of material on the belt. Similarly, the radiation source is of a length or is distributed so that its effective length is equal to or slightly greater than the width of material on the belt.

The details of construction of one suitable source and holder are shown in FIGURES 8–11. As there shown, a source holder is mounted in arm 31, which is of hollow cylindrical configuration. The source is mounted in a thin walled cylindrical housing 37. Housing 37 is held in place within arm 31 in any suitable manner, and is filled with a suitable absorber, such as lead 38. The absorber material is provided with a hollow cylindrical bore 40 in which is press fitted a tube 41. Tube 41 rotatably journals an inner tube 42. Tube 42 is also filled with an absorber, such as lead cylinder 43.

Absorber 43 is provided with an eccentric longitudinal bore 44 in which is mounted a small tube 45 and a radioactive source rod 14 formed of cesium 137. This rod is positioned within tube 45 by means of end plugs 46. The ends of inner tube 42 are likewise closed by means of cap members 47 and 48. Cap member 47 carries a stub shaft 50 which is rotatably journalled in end wall 51 of housing 37. Similarly, cam member 48 is formed integral or joined in any suitable manner to shaft 52. Shaft 52 extends outwardly through end wall 53 of housing 37 and is rotatably journalled in sleeve member 54 mounted in that wall. The outer end of shaft member 52 is rotatably journalled in bearing member 55 mounted in an opening in wall 56 of vertical arm 32 of the C-frame.

Figure 11:
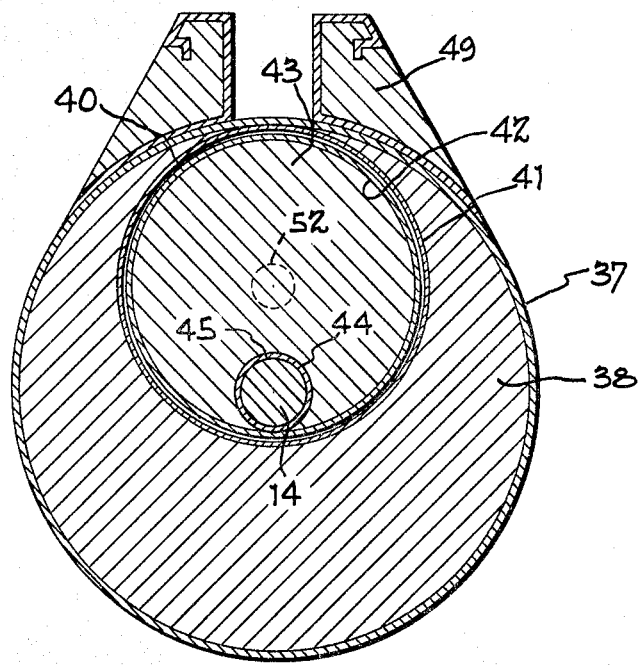
FIGURE 11 is a cross sectional view taken along line 11—11 of FIGURE 8.

Shaft 52 carries a handle member 58 which is rigidly secured to the shaft in any suitable manner, such as by means of a set screw 60. Handle 58 also carries a threaded locking bolt 61 adapted to engage recesses 62 and 63 machined in wall 56. When the handle is turned so that locking pin 61 engages recess 63, as is shown in FIGURES 8 and 11, the source 14 is disposed in the center of housing 37 and radiation from this source is effectively shielded by the lead absorbers 43 and 38. However, when handle 58 is rotated 180° to bring the locking pin 61 into registry with opening 62, the inner cylinder 42 is rotated 180° so that radioactive source 14 is disposed at the outer periphery of outer tube 41. In this position, radiation from this source is emitted upwardly through the material 11 on conveyor 12 and impinges upon the detector 15. The radiation is collimated by means of two collimating members 49 extending longitudinally of housing 37. These collimating members are of any suitable construction, such as lead cast in sheet metal frames or the like. The members are mounted upon the housing in any suitable manner.

The source 14 can also be positioned in a third or calibrating position. In this position the source is disposed intermediate the "closed" position illustrated in FIGURE 11 and the "open" position in which the source is disposed adjacent the periphery of tube 37. In the calibrating position the source emits an amount of radiation which simulates a predetermined amount of material on the belt. The calibrating position is determined by the abutment of handle 58 with stop screw 59 mounted in bracket 49.

The details of one preferred form of detector 15 are best shown in FIGURES 6, 7 and 12. As is shown in FIGURE 12, detector 15 comprises a stack of radiant energy electric generators, or Ohmart cells, 64. Each radiant energy electric generator 64 includes a cylindrical casing 65 constructed of brass or other radiation permeable material. One end of the casing is closed by means of a sheet end member 66 having a peripheral flange 67 brazed or soldered to the cylindrical casing wall 65. End wall 66 is spaced inwardly from the end of the cylindrical casing wall to form an annular space which houses an insulated seal member 68, such as glass to Kovar seal. A lead wire 69 passes through this seal and is connected, as explained below, to one of the electrodes.

The opposite end of the housing is enclosed by a heavy plate 70 which is soldered to the housing and includes an outwardly projecting annular flange 71 of substantially the same outer diameter as the inner diameter of the flange formed on the opposite end. Annular flange 71 is provided with a peripheral groove in which is mounted an O-ring 72. Plate 70 is provided with a threaded opening for receiving a suitable valve 79 which is inserted to seal off the casing after an ionizable filling gas, such as argon, has been inserted in the cell. Plate 70 is also provided with an opening in which is mounted a suitable sealing member, such as glass to Kovar seal 73. A conductive pin 74 passes through this seal into the interior of the housing.

A center post 75 threadably engages a recess formed on the inner face of plate 70. This post is constructed of steel, or other conductive material, and extends substantially the entire length of the housing. The opposite end of the post is provided with a threaded opening 76 which receives a bolt 77 for securing a cylindrical support plate 78 is position over the end of the post. Plate 78 is provided with an annular groove for receiving and supporting one end of cylindrical negative electrode 80.

Negative electrode 80 comprises a cylindrical sheet of brass shim stock, coated with an active material such as cadmium, magnesium or zinc. The electrode is placed within the peripheral groove in support plate 78 and is brazed or soldered to the plate. In addition to the cylindrical negative electrode member, the interior wall of housing 65 and the exterior surface of post 75 are coated with the same material used to coat the cylinder. These three elements are in electrical connection with one another since support member 78, the casing 65 and post 75 are all electrically conductive.

An annular brass mounting ring 81 is mounted within casing 65 closely adjacent to end plate 70. Ring 81 is spaced from, and electrically insulated from, the plate by means of a suitable insulator, such as Teflon ring 82. The Teflon ring and plate are held in position by means of bolts 83 which threadably engage openings formed in end plate 70. Bolts 83 are electrically insulated from plate 78 as by means of Teflon washers 84.

Mounting ring 81 is provided with two concentric grooves for receiving positive electrode members 85 and 86. These electrodes are tubular electrodes of a material electrochemically dissimilar to the negative electrode material. For example, positive electrodes 85 and 86 may be formed of tubes of steel or brass shim stock coated with lead dioxide or colloidal graphite.

The positive electrode assembly, including electrodes 85 and 86, is electrically connected to pin 69 which is joined to inner cylindrical electrode 86. The positive electrodes are also connected to pin 74 at the opposite end of the housing. Consequently, both positive electrode members are insulated from the housing and are connected to conductive pins mounted within the annular spaces disposed at opposite ends of the housing.

When assembling cells 64 to form a stack or elongated strip detector, the cells are oriented so that the plate end 70 of one cell fits within the annular opening defined by end wall 66 of the adjacent cell. The male pin 69 fits within female pin 74 to electrically connect the positive electrodes of the cells. This connection is protected by the seal provided by the O-ring 72. The cells are locked together by means of bolts 87 which pass through aligned threaded openings formed in the cell housings.

As is shown in FIGURES 6 and 7, the stack of cells 64 is enclosed within an aluminum heat exchange sleeve 90. This sleeve is split, the two halves of the sleeve being assembled as by means of a plurality of elongated bolts 91 passing through ears 92 on adjacent sleeve halves. Sleeve 90 is provided with a bore at one end in which is mounted a mercury thermostat 93. Mercury thermostat 93 controls the energization of a resistance heater 94 which is mounted around sleeve 90. This resistance heater unit and thermostat are effective to maintain the cells at a predetermined temperature, for example 140°. As is shown in FIGURE 7, an annular gasket member 95 is compressed between the end of resistance heater pad 94 and junction box 96. The cylindrical junction box is bolted to the end of the aluminum sleeve as by means of bolts 97 and spacers 98.

The resistance heater pad 94 is enclosed within an annular insulating blanket 100 which is in turn inserted within upper arm 30 of the C-frame. As was indicated previously, the effective length of the cells 15 within arm 30 is preferably at least as wide as the conveyor belt 12.

When the measuring unit is installed on the belt conveyor, the C-frame is positioned transversely across the belt in any convenient place. The C-frame is supported by its own base and requires no modification whatsoever of the conveyor. After the various electrical connections have been made, the next step is to calibrate the unit. As a first step, the belt is operated empty and the source holder is shifted to its open position with the radioactive source 14 disposed adjacent to the periphery of outer housing 37. The radiation from this source then passes upwardly through the empty belt and impinges upon the cells 15. In the specific embodiment shown, the Ohmart cells are connected in parallel and generate a current which is applied to amplifier 16. A bucking current of opposite polarity is then applied to the amplifier input to null out the current generated by the Ohmart cells. As a practical matter this is accomplished by means of a compensating Ohmart cell or by adjusting the conventional zero suppression potentiometer in the amplifier. By this means, belt weight is eliminated as the factor in determining the final weight of material conveyed.

In the next step, the source is returned to its open position and a known weight of material is placed on the conveyor belt. This material absorbs some of the radiation emitted from the source 14. Consequently, the Ohmart cells 15 produce a smaller current. This current is amplified by amplifier 16 and is noted on weight recorder 17. The scale on this recorder is calibrated so that the scale recorded corresponds to the known weight of material on the belt.

In order to simplify subsequent calibrations, the belt is emptied and the source holder is rotated to an intermediate or "calibrating" position in which with the belt empty the recorder signal corresponds to a full scale reading. Stop screw 59 is then adjusted so that it abuts the handle 58. Thereafter, the source can readily be returned to precisely this same calibrating position whenever desired by merely bringing handle 58 into abutment with stop screw 59.

The system is now ready to be put into operation. Material is fed to the conveyor and passes between the two arms of the C-frame. Radiation from the detector impinges upon the cells, the amount of radiation impinging upon the cells being attenuated by the material on the conveyor. Hence, all of the cells sense the weight of material per unit length of the belt. Since the end cells extend outwardly beyond the extreme outward position of the material, all of the material is effectively weighed.

The current generated from the cells is amplified by amplifier 16. The output from this amplifier is applied to a weight per unit length recorder 17 and to an input lead of mass flow recorder 18. A second signal correlated with belt speed is generated by tachometer 20. The output voltage of this tachometer is applied to speed recorder 21 and to mass flow recorder 18. These two signals are multiplied in any suitable manner, for example by a conventional potentiometric slide wire mechanism in the recorder to provide a signal correlated with weight per hour. This signal is applied to totalizer 22. Totalizer 22 is preferably an analog device and in one suitable form includes a ring and disc integrator driven from the potentiometric slide wire. The disc is driven by a synchronous motor while the ring is positioned by the output signal from the slide wire of mass flow recorder 18. A digital counter adds up the revolutions of this unit to record total weight.

I have empirically determined that one of the major sources tending to produce errors in weight measurement is a shift in the transverse profile of the material. In other words, material randomly fed to the conveyor will tend to have a peak or high point in the center of the conveyor part of the time, on the left-hand portion of the conveyor part of the time and on the right-hand portion of the conveyor part of the time. In accordance with the present invention, errors due to this cause are effectively minimized by the use of the combination of a distributed source, such as a strip source or a plurality of spaced point sources, and a strip detector of a length substantially equal to or slightly greater than the width of the belt.

One explanation for this can best be appreciated from a study of FIGURE 14. This figure shows the relationship between the amount of radiation impinging upon different portions of the elongated cell stack when a strip source is used as compared to the radiation impinging upon the cell when a point source is used. As is apparent from this figure, when a point source is used the radiation pattern tends to peak at the center and to fall off fairly rapidly toward either side of the detector. Consequently, a material peak which is directly in the center of the belt will be effective to absorb much more radiation than will exactly the same peak offset appreciably to either side of the center. As a result, the current output of the detector will change substantially with the profile of the material on the belt even though the same total amount of material is present.

In contrast, when an elongated source is employed, the radiation curve is much more uniform across the width of the belt so that whether the peak is located at the center of the belt or is displaced to the right or the left of the center, it is effective to absorb substantially the same amount of radiation and the current output of the cells remains substantially the same for all horizontal profiles of the material of the same weight.

Although as has been indicated previously, many different types of detectors such as Geiger counters or ionization chambers can be employed, Ohmart cells or radiant energy electric generators are particularly advantageous for several reasons. In the first place, these detectors actually function as current generators in which the energy of the radiation impinging upon the cells is directly converted to an electric current. Consequently, the need for a high potential biasing field is completely eliminated. Also, the response of the cell is not adversely affected by statistical variations in the radioactive radiation. As is explained in Patent No. 2,956,166, the elimination of errors due to statistical variations in radiation is believed to be due to the formation of an ion cloud in the vicinity of the electrodes.

This same phenomenon, which gives a cell operating characteristics in some respects similar to the behavior of an internal capacitance, has been found to have an advantageous effect in the present system. This can best be understood from a consideration of FIGURE 13. This figure illustrates the manner in which the present system responds to a very rapid and substantial change in the weight of material on the conveyor, such as would occur for example if a large rock or void passed between the gage and radiation source. The square wave shows diagrammatically the theoretical response of the device if it responded precisely to a rapid change in belt loading. The curved lines 102 and 103 show the manner in which the measuring device actually responds to the change. Curved line segment 102 shows that the current increase in the output of cells 64 occurs more slowly than the theoretical increase corresponding to the actual physical change in the material weight. Also, the current output reaches a maximum value less than the theoretical maximum current corresponding to this actual weight change. Curve portion 103 represents the change in current output of cells 64 after the rapid weight change event has terminated, i.e. curve 103 shows the return of cell output current to the normal level. As is apparent from this curve, the cell output current does not return to the normal level immediately as does the theoretical current, but rather falls exponentially over a protracted period of time. The charge time constant of the cell and the discharge time constant of the output circuit of the cell are made substantially equal by proper matching of components. It is the total area under the curves 102 and 103 which is integrated to provide a measurement of weight, and this area is substantially equal to the area under the theoretical square wave to within one-half of one percent.

In its overall performance during protracted periods of operation, the present weighing system is effective to weigh material flowing on a conveyor with an error of less than one-half of one percent; and in some instances the error has been less than one-fourth of one percent. Even for short periods of time, the error on the present system is less than one percent.

From the foregoing disclosure of the general principles of the present invention and the above description of a preferred embodiment, those skilled in the art will readily comprehend various modifications to which the invention is susceptible. Therefore, I desire to be limited only by the scope of the following claims.

Having described my invention, I claim:

1. A method of weighing material carried by a conveyor, said material having a changing volumetric or density profile, said method comprising the steps of horizontally disposing a distributed source of radioactive material and an elongated detector of radiant energy in a vertical plane above and below said conveyor, the distributed source of radioactive material and elongated detector extending transversely of the conveyor and being at least substantially as long as the distribution of material on said conveyor, attenuating radiation impinging upon the detector with the material being measured, utilizing said detector to produce a continuous current flow correlated with the weight of material per unit length of said conveyor and integrating said continuous current flow with time to produce an output signal correlated with the total weight of said material.

2. A method of weighing material carried by a conveyor, said material having a changing volumetric or density profile, said method comprising the steps of horizontally disposing a distributed source of radioactive material and an elongated detector of radiant energy in a vertical plane above and below said conveyor, the distributed source of radioactive material and elongated detector extending transversely of the conveyor and being at least substantially as long as the distribution of material on said conveyor, attenuating radiation impinging upon the detector with the material being measured, utilizing said detector to produce a first continuous electrical signal correlated with the weight of material per unit length of said conveyor, generating a second electrical signal correlated with conveyor speed, multiplying said signals to obtain a third signal, and integrating said third signal with time to produce an output signal correlated with the total weight of said material.

3. Apparatus for measuring weight of material having a changing volumetric or density profile on a conveyor, said apparatus comprising an elongated source of radiation, means supporting said radiation in a horizontal plane spaced from said conveyor, the source of radiation extending transversely of said conveyor, an elongated detector, means supporting said detector in a horizontal plane spaced from said conveyor and disposed on the opposite side of the conveyor from said source, said detector being disposed in the same vertical plane with said source and parallel with said source, said detector and said source being at least substantially as long as the distribution of material on said conveyor, said detector being effective to cause a continuous current flow correlated with weight of material on a unit length of said conveyor, and means for electrically integrating said current with time to produce a signal correlated with the total weight of material on said conveyor.

4. Apparatus for measuring weight of material having a changing volumetric or density profile on a conveyor, said apparatus comprising an elongated source of radiation, means supporting said radiation in a horizontal plane spaced from said conveyor, the source of radiation extending transversely of said conveyor, an elongated detector, means supporting said detector in a horizontal plane spaced from said conveyor and disposed on the opposite side of the conveyor from said source, said detector being disposed in the same vertical plane with said source and parallel with said source, said detector and said source being at least substantially as long as the distribution of material on said conveyor, said detector being effective to produce a first continuous electrical signal correlated with weight of material on a unit length of said conveyor, means for generating a second electrical signal correlated with conveyor speed, means for multiplying said first and second signals to produce a third signal, and means for electrically integrating said third signal to produce a signal correlated with the total weight of material on said conveyor.

References Cited by the Examiner

UNITED STATES PATENTS

| | | | |
|---|---|---|---|
| 2,922,884 | 1/1960 | Fearnside | 250—83.3 |
| 2,954,811 | 10/1960 | Hensgen | 250—83.3 |
| 2,956,166 | 10/1960 | Ohmart | 250—83.3 |
| 2,967,242 | 1/1961 | Halben | 250—83.3 |
| 3,016,460 | 1/1962 | Andersen | 250—83.3 |
| 3,066,562 | 12/1962 | Barnett | 250—83.3 |
| 3,070,692 | 12/1962 | Ohmart | 250—83.3 |
| 3,132,247 | 5/1964 | Wright | 250—83.3 |

RALPH G. NILSON, *Primary Examiner.*

JAMES W. LAWRENCE, *Examiner.*

ARCHIE R. BORCHELT, *Assistant Examiner.*